US011967755B2

(12) United States Patent
Bye

(10) Patent No.: US 11,967,755 B2
(45) Date of Patent: Apr. 23, 2024

(54) CELLULAR ANTENNA ENCLOSURES

(71) Applicant: DISH Wireless L.L.C., Littleton, CO (US)

(72) Inventor: Stephen Bye, Littleton, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/164,465

(22) Filed: Feb. 3, 2023

(65) Prior Publication Data

US 2023/0187817 A1 Jun. 15, 2023

Related U.S. Application Data

(62) Division of application No. 17/183,240, filed on Feb. 23, 2021, now Pat. No. 11,594,808.

(60) Provisional application No. 63/019,002, filed on May 1, 2020.

(51) Int. Cl.
*H01Q 1/24* (2006.01)
*H01Q 1/00* (2006.01)
*H01Q 1/02* (2006.01)
*H01Q 1/42* (2006.01)
*H01Q 1/12* (2006.01)

(52) U.S. Cl.
CPC ............. *H01Q 1/246* (2013.01); *H01Q 1/005* (2013.01); *H01Q 1/02* (2013.01); *H01Q 1/428* (2013.01); *H01Q 1/1242* (2013.01); *H01Q 1/125* (2013.01)

(58) Field of Classification Search
CPC ...................................................... H01Q 1/246
See application file for complete search history.

(56) References Cited

U.S. PATENT DOCUMENTS

| | | | | |
|---|---|---|---|---|
| 7,460,080 | B1 | 12/2008 | Watson, III | |
| 7,891,939 | B1 | 2/2011 | Zuteck | |
| 9,698,477 | B1 * | 7/2017 | Jabara | E04H 12/342 |
| 2004/0086340 | A1 * | 5/2004 | Steinkamp | H01Q 1/005 405/211 |
| 2007/0229375 | A1 | 10/2007 | Cislo | |
| 2007/0253208 | A1 * | 11/2007 | Howard | F21V 21/116 362/373 |
| 2008/0001841 | A1 | 1/2008 | Alberding | |
| 2009/0223164 | A1 | 9/2009 | Cook | |
| 2015/0004423 | A1 * | 1/2015 | Cheon | H01Q 1/422 428/521 |

(Continued)

FOREIGN PATENT DOCUMENTS

| | | |
|---|---|---|
| EP | 3 033 805 A1 | 6/2016 |
| JP | 2004 172895 A | 6/2004 |

OTHER PUBLICATIONS

Wikipedia, Kammback, https://en.wikipedia.org/wiki/Kammback (Year: 2015).

(Continued)

*Primary Examiner* — Ab Salam Alkassim, Jr.
(74) *Attorney, Agent, or Firm* — Kilpatrick Townsend & Stockton LLP

(57) ABSTRACT

Various base station enclosures and systems are detailed herein. Such systems can include, a radio unit (RU) and a plurality of cellular antennas. A base station cellular enclosure is present that reduces wind drag. The enclosure can include an airfoil enclosure housing that defines a cavity for housing the plurality of antennas and is at least partially covered in dimples to reduce wind drag.

17 Claims, 11 Drawing Sheets

(56) References Cited

U.S. PATENT DOCUMENTS

| | | | | |
|---|---|---|---|---|
| 2015/0022423 | A1* | 1/2015 | Johnson | B29C 66/72141 156/217 |
| 2015/0057047 | A1* | 2/2015 | Hendrix | H04B 1/40 455/562.1 |
| 2016/0248151 | A1* | 8/2016 | Proshold | H01Q 1/42 |
| 2016/0329633 | A1 | 11/2016 | Hendrix | |
| 2016/0329641 | A1* | 11/2016 | Lee | H01Q 19/108 |
| 2017/0279187 | A1* | 9/2017 | Lockwood | H01Q 1/42 |
| 2018/0026327 | A1 | 1/2018 | Hendrix | |
| 2018/0108978 | A1* | 4/2018 | Gonsowski | H01Q 1/42 |
| 2018/0323503 | A1* | 11/2018 | Bouchard | H05K 5/0226 |
| 2020/0040870 | A1 | 2/2020 | Monto | |
| 2020/0182451 | A1* | 6/2020 | Girouard | H04W 88/08 |
| 2020/0313275 | A1* | 10/2020 | Norrell | H01Q 9/32 248/539 |
| 2021/0050660 | A1 | 2/2021 | Anderson | |
| 2021/0261008 | A1* | 8/2021 | Lapham | B60L 53/31 |
| 2021/0313665 | A1* | 10/2021 | Hoganson | H01Q 1/02 |
| 2021/0313666 | A1* | 10/2021 | Castronova | H01Q 1/02 |
| 2021/0336331 | A1* | 10/2021 | Rai | H01Q 21/28 |
| 2021/0344104 | A1* | 11/2021 | Bye | H01Q 1/005 |
| 2022/0149503 | A1* | 5/2022 | Petrosyan | H01Q 1/1242 |
| 2022/0285826 | A1* | 9/2022 | Ruiz | H01Q 1/1242 |
| 2023/0061818 | A1* | 3/2023 | Westergaard | F03D 9/25 |

OTHER PUBLICATIONS

International Search Report and Written Opinion for PCT/US2021/028769 dated Aug. 3, 2021, all pages.

* cited by examiner

CELLULAR ANTENNA ENCLOSURES

CROSS-REFERENCE TO RELATED APPLICATIONS

This application is a divisional of U.S. Non-Provisional patent application Ser. No. 17/183,240, filed on Feb. 23, 2021, entitled "Cellular Antenna Enclosures," which claims priority to U.S. Provisional Patent Application No. 63/019,002, filed on May 1, 2020, entitled "Cellular Antenna Enclosures," the disclosures of which are hereby incorporated by reference in their entireties for all purposes.

BACKGROUND

Cellular antennas and cellular radios are typically attached to cellular towers ("cell towers") of cellular base stations. Cell towers are constructed such that wind loading on the tower, radios, and antennas does not cause significant stress on the tower, significant sway, or the cell tower to collapse. However, to build such a cell tower that is not significantly affected by the wind load may be expensive, time consuming, and resource consuming.

SUMMARY

Various embodiments are described related to a base station cellular antenna enclosure. In some embodiments, a base station cellular antenna enclosure is described. The device may comprise an airfoil enclosure housing that defines a cavity for housing a base station cellular antenna. The airfoil enclosure housing may comprise a leading edge. The airfoil enclosure housing may comprise a first vent that permits air from external the airfoil enclosure housing to enter the cavity of the airfoil enclosure housing. The device may comprise a rotatable coupling that attaches the airfoil enclosure housing to a support structure. The rotatable coupling may allow the airfoil enclosure housing to rotate based on wind such that the leading edge faces into the wind.

Embodiments of such a method may include one or more of the following features: the airfoil enclosure housing may further comprise a second vent located on a top surface of the airfoil enclosure housing, whereby the first vent and second vent permit convection air flow through the cavity. The rotatable coupling may allow the airfoil enclosure housing to rotate an unlimited amount clockwise and counterclockwise. An exterior of the airfoil enclosure housing may at least be partially covered in dimples. The airfoil enclosure housing may further comprise a tail. The rotatable coupling may allow the airfoil enclosure housing to rotate based on wind such that the tail faces away from the wind. The airfoil enclosure housing may be a K-tail design such that a wake region may be present and the airfoil enclosure housing does not have a tail. The cavity defined by the airfoil enclosure housing may house multiple cellular antennas. The cavity defined by the airfoil enclosure housing may house a radio unit (RU). The airfoil enclosure housing may be symmetrical biconvex in shape.

In some embodiments, a base station cellular antenna enclosure is described. The device may comprise a K-tail airfoil enclosure housing that defines a cavity for housing a base station cellular antenna. The K-tail airfoil enclosure housing may comprise a leading edge. The K-tail airfoil enclosure housing may comprise a first vent that permits air from external the K-tail airfoil enclosure housing to enter the cavity of the airfoil enclosure housing. The device may comprise one or more enclosure attachments that attach the K-tail airfoil enclosure housing to a fixed structure. The one or more enclosure attachments may be located within a wake region defined by the K-tail airfoil enclosure housing.

Embodiments of such a method may include one or more of the following features: the K-tail airfoil enclosure housing may further comprise a second vent located on a top surface of the K-tail airfoil enclosure housing, whereby the first vent and second vent permit convection air flow through the cavity. The one or more enclosure attachments may hold the K-tail airfoil enclosure housing in a fixed orientation. An exterior of the K-tail airfoil enclosure housing may be at least partially covered in dimples. The airfoil enclosure housing may be symmetrical biconvex in shape. The cavity defined by the airfoil enclosure housing may house a radio unit (RU).

In some embodiments, a base station cellular antenna enclosure may be described. The device may comprise a spherical airfoil enclosure housing that defines a cavity for housing a base station cellular antenna. The spherical airfoil enclosure housing may comprise a first halo vent that permits air from external the spherical airfoil enclosure housing to enter the cavity of the airfoil enclosure housing. The device may comprise one or more attachments that attach the spherical airfoil enclosure housing in a fixed orientation to a fixed structure.

Embodiments of such a method may include one or more of the following features: the spherical airfoil enclosure housing may further comprise a second halo vent located on the spherical airfoil enclosure housing, whereby the first halo vent and the second halo vent permit convection air flow through the cavity. The spherical airfoil enclosure housing may further comprise a top vent located at a top of the spherical airfoil enclosure and a bottom vent located at a bottom of the spherical airfoil enclosure. An exterior of the spherical airfoil enclosure housing may be at least partially covered in dimples. The cavity defined by the spherical airfoil enclosure housing may house multiple cellular antennas.

BRIEF DESCRIPTION OF THE FIGURES

A further understanding of the nature and advantages of various embodiments may be realized by reference to the following figures. In the appended figures, similar components or features may have the same reference label.

DETAILED DESCRIPTION

Embodiments detailed herein are focused on aerodynamic enclosures for cellular antennas, cellular radios, and, possibly, other cellular components of a cellular base station that are attached with a cell tower or some other form of raised structure that is functioning as a mounting point for cellular antennas and, possibly, cellular radios.

By using an aerodynamic enclosure at a base station for cellular antennas, cellular radios, and, possibly, other cellular components that are fastened to a cell tower, the amount of wind loading on the cellular tower can be decreased. For example, cell towers may be designed to handle 110 mile per hour winds. By decreasing the amount of wind loading that needs to be planned for, the cell tower may need fewer structural reinforcements and, therefore, may be able to be constructed more economically efficiently and yet still be able to withstand the same speed of winds.

Figure 1:
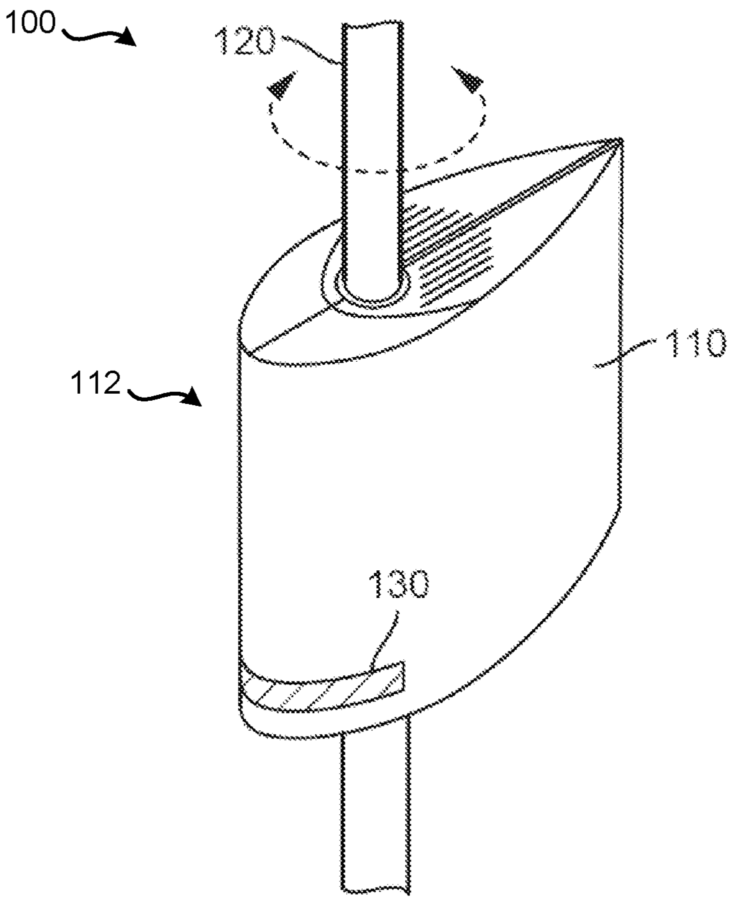
FIG. 1 illustrates a perspective view of an airfoil enclosure that houses cellular components.

In a first set of embodiments, an aerodynamic structure may be free to rotate around a central supporting structure. FIG. 1 illustrates a perspective view of an airfoil enclosure system 100 that houses cellular components of a base station. Within the airfoil enclosure may be one or more cellular radio network components, such as: one or more cellular antennas (e.g., for a 4G LTE or 5G NR cellular RAT network); one or more cellular radios; and/or one or more other cellular network components. Airfoil enclosure housing 110 may define a cavity that can be used to house the cellular components. Airfoil enclosure housing 110 deflects wind around housed cellular components. More specifically, the width (w) and length (l) (see FIG. 2) of airfoil housing may be sized to: 1) be sufficiently large to house the cellular components present; and 2) minimize the zero-lift drag coefficient. In some embodiments, some or all of airfoil housing may be covered in dimples that help further decrease the amount of drag.

Airfoil enclosure housing 110 may generally have a cross-section in the shape of an airfoil. Specifically, the cross section may be symmetrical biconvex (or, possibly, asymmetrical biconvex). Airfoil enclosure housing 110 may have a cross section designed to not create lift (or only create minimal lift) in a particular direction when wind is present. Rather, the airfoil enclosure housing 110 may be shaped such that in the presence of wind, airfoil enclosure housing 110 such that leading edge 112 of airfoil enclosure housing 110 faces the direction of the wind and trailing edge 114 is away from the direction from which the wind originates. The air speed on either side of leading edge 112 is approximately the same, thus eliminating or at least limiting the amount of lift.

Venting may be present on one or more sides of airfoil enclosure housing 110. Front vents 130, which may be present on leading edge 112, can allow air to enter an interior region of airfoil enclosure system 100 where the cellular components are housed. Wind, when present, can force air into front vents 130. Additionally, front vents 130 may also allow air to be drawn in due to heating of the air by cellular components occurring within airfoil enclosure housing 110. Such heating can cause a convection air current to be present. Front vents 130 may be located on a lower front portion of airfoil enclosure housing 110 to help circulate air due to the convection air current caused by the heating of air by cellular components within airfoil enclosure housing 110. One or more exhaust vents may be located at a higher location on airfoil enclosure housing 110 than front vents 130, such as top vents 140. In other embodiments, a second set of front vents may be present on leading edge 112 that are located above front vents 130, thus allowing convection to remove warm air from within airfoil enclosure system 100.

Figure 2:
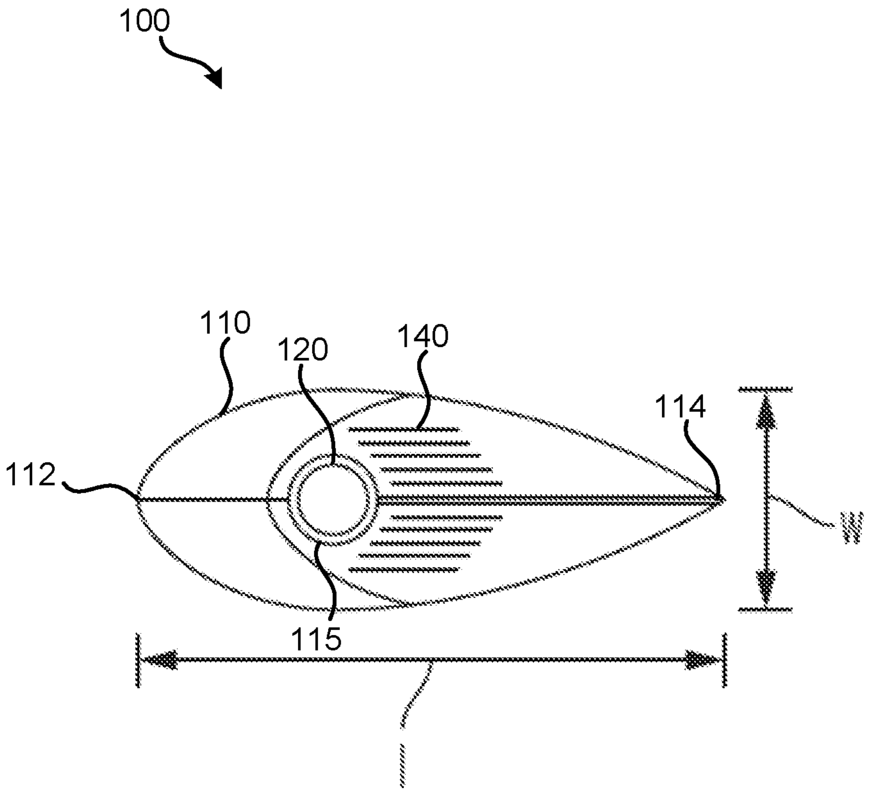
FIG. 2 illustrates a top view of the airfoil enclosure of FIG. 1 that houses cellular components.

FIG. 2 illustrates a top view of an airfoil enclosure system 100 that houses cellular components of a base station. Top vents 140 may be present on a top surface of airfoil enclosure housing 110. The top surface of airfoil enclosure housing 110 may generally be flat. As air is heated within airfoil enclosure housing 110 is heated, the heated air may rise and exit from airfoil enclosure system 100 via top vents 140. Air external to airfoil enclosure housing 110 may be drawn in through front vents 130. Additionally or alternatively, vents similar to top vents 140 may be present on a bottom of airfoil enclosure housing 110, which can increase the amount of air drawn into airfoil enclosure housing 110. Top vents 140 and bottom vents may be present instead of front vents 130.

Airfoil enclosure housing 110 may be attached with a rotatable coupling 115 that allows airfoil enclosure housing 110 to pivot around a central structure 120, which may be a pole or some other form of support. A bearing assembly or some other form of rotatable coupling 115 may be used to attach airfoil enclosure housing 110 to central structure 120. Airfoil enclosure housing 110 can be free to rotate an unlimited amount clockwise or counterclockwise around central structure 120 due to rotatable coupling 115. Wind may cause airfoil enclosure housing 110 to rotate via the rotatable coupling and orient itself based on the wind direction such that leading edge 112 faces the wind and trailing edge 114 is away from the wind. Within airfoil enclosure housing 110, cellular components may remain in a fixed position relative to central structure 120. That is, while airfoil enclosure housing 110 rotates based on the wind direction, cellular components remain in a fixed position. Therefore, an antenna within airfoil enclosure housing 110 remains pointed in a fixed direction.

To further reduce drag, all cabling to the cellular components may be routed within central structure 120 or some other structure. For a single central structure, a single or multiple airfoil enclosures housings may be present. For instance, different cellular networks may each have their own cellular components (e.g., antennas, radios) housed in separate airfoil enclosures.

Figure 3:
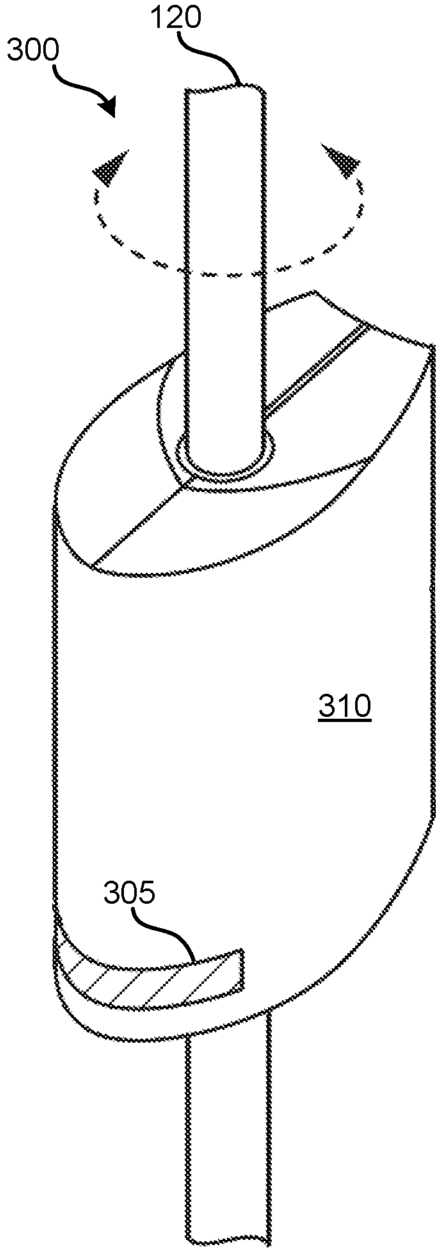
FIG. 3 illustrates a perspective view of an airfoil enclosure that houses cellular components.

FIG. 3 illustrates a perspective view of an airfoil enclosure system 300 that houses cellular components of a base station. Airfoil enclosure system 300 may function similarly to airfoil enclosure system 100, including having airfoil enclosure housing 310 define a cavity to house cellular components. Airfoil enclosure housing 310 may include front vents 305. However, airfoil enclosure housing 310, rather than having a teardrop profile as seen in FIG. 2, may have a cut off "tail" of the teardrop cross-section that results in a minimal change in aerodynamic efficiency.

Figure 4:
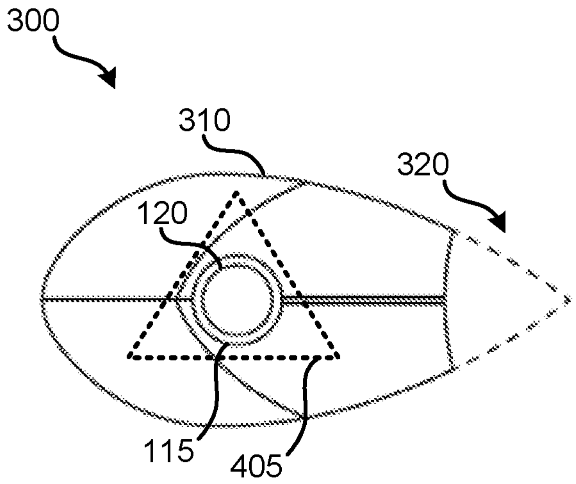
FIG. 4 illustrates a top view of the airfoil enclosure of FIG. 3 that houses cellular components and has a cut-off tail.

FIG. 4 illustrates a top view of airfoil enclosure system 300 that houses cellular components and has a cut-off tail. This design can be understood as a form of "Kammback" design or "k-tail" design. Instead of the "tail," wake region 320 is present, indicated by a dotted line. Therefore, the location where the tail would be present, is instead wake region 320. Again here, airfoil enclosure housing 310 may allow for wind to be efficiently deflected around the cellular components. More specifically, the width (w) and length (l) of the airfoil enclosure housing may be sized to: 1) be sufficiently large to house the cellular components present;

and 2) minimize the zero-lift drag coefficient. Vents may or may not be present on top of airfoil enclosure housing 310.

FIG. 4 further illustrates a top view of multiple cellular antennas 405 that may be located in a fixed position and attached with the central structure 120 within airfoil enclosure housing 310. The sizing of multiple cellular antennas 405 and airfoil enclosure housing 310 may be such that sufficient clearance around multiple cellular antennas 405 is present to allow airfoil enclosure housing 310 to freely rotate.

Figure 5:
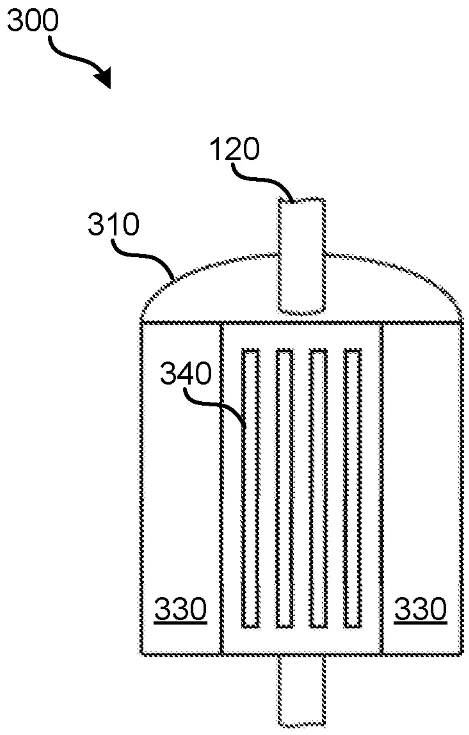
FIG. 5 illustrates a rear view of the airfoil enclosure of FIG. 3 that houses cellular components and has a cut-off tail.

FIG. 5 illustrates a rear view of airfoil enclosure system 300 that houses cellular components and has a cut-off tail. Rear vents 340 present on airfoil enclosure housing 310, which may be located on tail housing structure 330 and can be understood as attached with or part of airfoil enclosure housing 310, may vent warm air from within airfoil enclosure system 300 to the external environment.

Additionally or alternatively, top and/or bottom vents may be present to allow for convection currents to provide airflow and cooling within airfoil enclosure system 300. Further, as indicated in reference to airfoil enclosure system 300, dimples may be present on airfoil enclosure housing 310 to allow for a further reduction in wind drag. As with airfoil enclosure system 100, the width and length of airfoil enclosure housing 310 may be sized to: 1) be sufficiently large to house the cellular components present; and 2) minimize the zero-lift drag coefficient.

Figure 6:
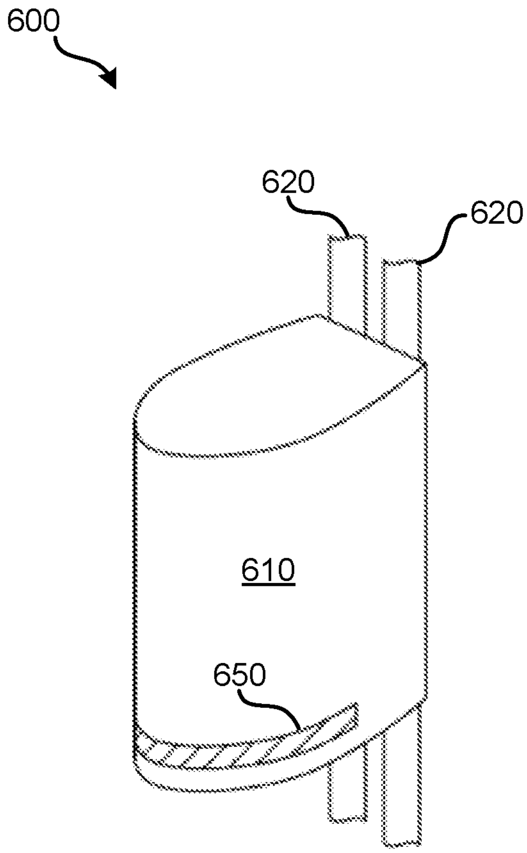
FIG. 6 illustrates a perspective view of an airfoil enclosure that houses cellular components.

FIG. 6 illustrates a perspective view of an airfoil enclosure system 600 that houses cellular components of a base station. Airfoil enclosure system 600 may function similarly to airfoil enclosure system 300; however, rather than pivoting freely around central structure 120, airfoil enclosure system 600 may be fixed in a particular orientation. Airfoil enclosure housing 610 defines an internal cavity that can be used to house cellular components and shelter such components from the wind. Airfoil enclosure system 600 may be mounted to a structure that does not allow for pivoting around a central structure. For instance, cellular components may be mounted to a side of a building or a water tower. In such situations, airfoil enclosure system 600 may decrease the amount of wind loading from one or more particular directions.

Airfoil enclosure system 600 can include front vents 650 located on airfoil enclosure housing 610. A cross-section of airfoil enclosure housing 610 may be shaped similarly to airfoil enclosure housing 110 or airfoil enclosure housing 310 (as pictured). As described in relation to airfoil enclosure housing 310, bottom, top, and/or back vents may be present to facilitate cooling of housed components using wind and/or air convention currents. Further, dimples may be present on airfoil enclosure housing 610 to allow for a further reduction in wind drag.

Figure 7:
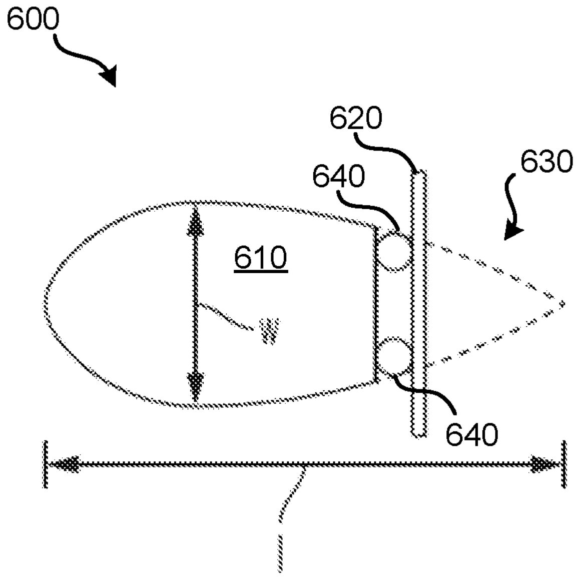
FIG. 7 illustrates a top view of the airfoil enclosure of FIG. 6 that houses cellular components.

FIG. 7 illustrates a top view of airfoil enclosure system 600 that houses cellular components. Airfoil enclosure system 600 can allow for attachment with one or more fixed structures 620. Fixed structure 620 (e.g., a building, a bridge, a water tower, a cellular tower, a lighting or telephone pole, etc.), may be located within wake region 630. Enclosure attachments 640 may be used to attach fixed structure 620 with airfoil enclosure system 600. Again here, airfoil enclosure housing 610 may allow for wind to be efficiently deflected around the cellular components. More specifically, the width (w) and length (l) of airfoil enclosure housing 610 may be sized to: 1) be sufficiently large to house the cellular components present; and 2) minimize the zero-lift drag coefficient. In some embodiments, airfoil enclosure housing 610 may be mounted directly to fixed structure 620.

Figure 8:
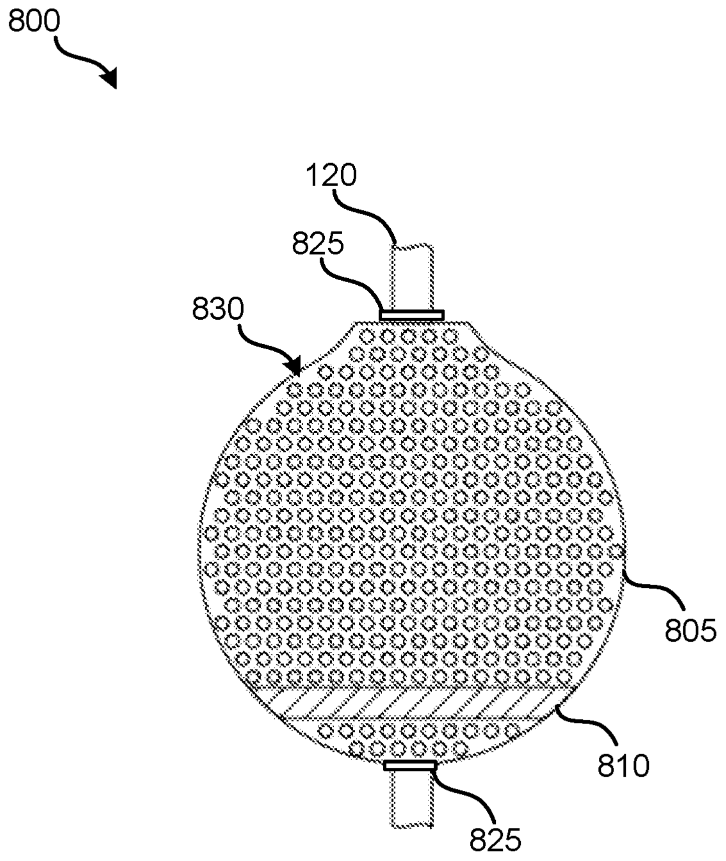
FIG. 8 illustrates a front view of an airfoil enclosure that houses cellular components.

FIG. 8 illustrates a front view of airfoil enclosure system 800 that houses cellular components. Airfoil enclosure system 800 may use one or more attachments such as attachments 825, to attach to central structure 120 in a fixed orientation such that it does not pivot based on wind. A front profile of airfoil enclosure housing 805 is generally circular and an overall shape of airfoil enclosure housing 805 is generally spherical. The term "spherical" as used in this document describes the general shape of airfoil enclosure housing 805; small deviations from spherical may be made for attachment points, dimples, vents, etc. Airfoil enclosure housing 805 defines a cavity that can house one or more cellular components and shelter such components from the wind (and other elements). This profile may be the same or similar from all sides, thus making airfoil enclosure housing 805 effective at reducing wind loading from all directions parallel to the ground.

Figure 9:
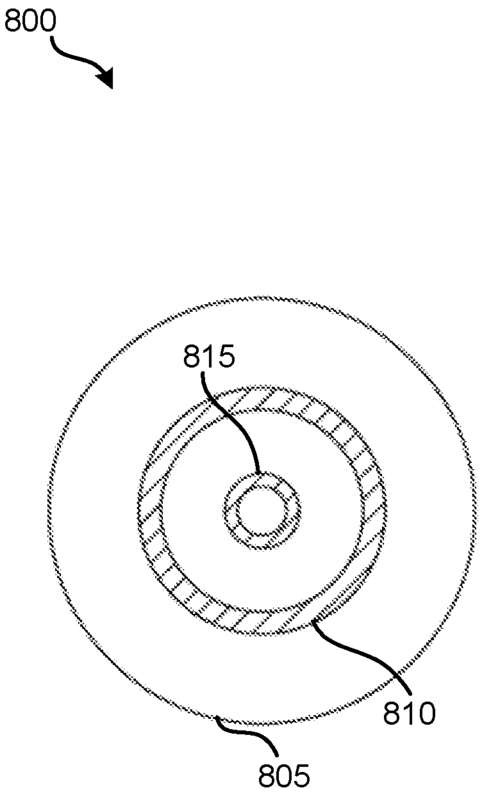
FIG. 9 illustrates a bottom view of the airfoil enclosure of FIG. 8 that houses cellular components.

FIG. 9 illustrates a bottom view of airfoil enclosure system 800 that houses cellular components. Airfoil enclosure system 800 may have a round profile to decrease wind resistance from any direction. Airfoil enclosure housing 805 may be wholly or partially covered in dimples that further decrease wind resistance. Within airfoil enclosure housing 805 may be one or more cellular antennas and/or one or more cellular radios and/or radio units.

Multiple venting structures may be present to facilitate: some wind entering airfoil enclosure housing 805 to cool the cellular components and a convection current venting warm air from within airfoil enclosure system 800 and drawing in air from the external environment via a convection current. In some embodiments, bottom halo vent 810 is present on airfoil enclosure housing 805. Bottom halo vent 810 may be positioned a distance above a bottom of airfoil enclosure system 800 to capture some amount of wind incident upon airfoil enclosure housing 805. Bottom vent 815 may assist in allowing a convection current to draw air through airfoil enclosure housing 805. Bottom halo vent 810 and bottom vent 815 may be circular in shape and may form a continuous circular or halo-shaped opening around airfoil enclosure housing 805.

Figure 10:
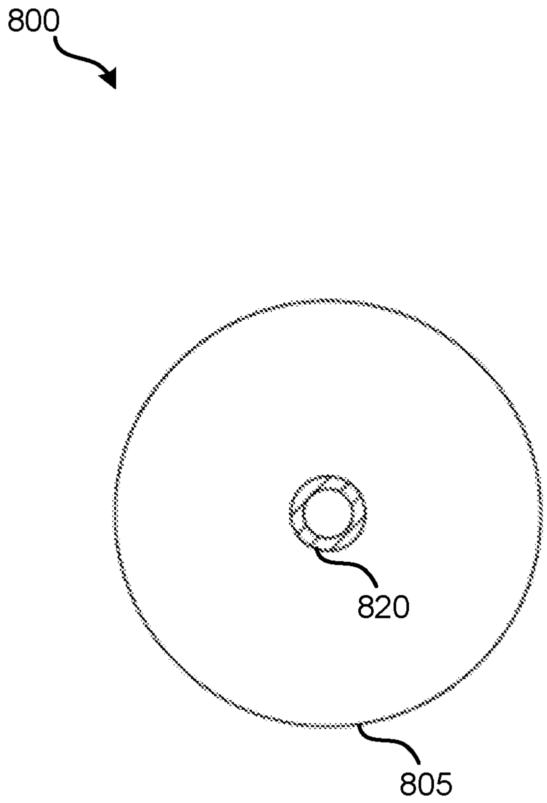
FIG. 10 illustrates a top view of the airfoil enclosure of FIG. 8 that houses cellular components.

FIG. 10 illustrates a top view of airfoil enclosure system 800 that houses cellular components. Top vent 820 may be located at or near the top of airfoil enclosure system 800 to maximize the amount of air vented by a convection current through the interior of airfoil enclosure system 800 from bottom halo vent 810 and/or bottom vent 815. In some embodiments, additionally or alternatively, a top halo vent is present that is positioned a distance below the top of airfoil enclosure housing 805 to capture some amount of wind incident upon airfoil enclosure housing 805.

Dimples 830 may be present on airfoil enclosure housing 805 to allow for a further reduction in drag. Various patterns of dimples and variations in the size of dimples may be used, similar to a golf ball, to achieve improvements in the reduction of drag. (While dimples 830 are not illustrated in FIGS. 9 and 10, dimples may be present on all or a significant portion (greater than 75%) of airfoil enclosure housing 805.

Figure 11:
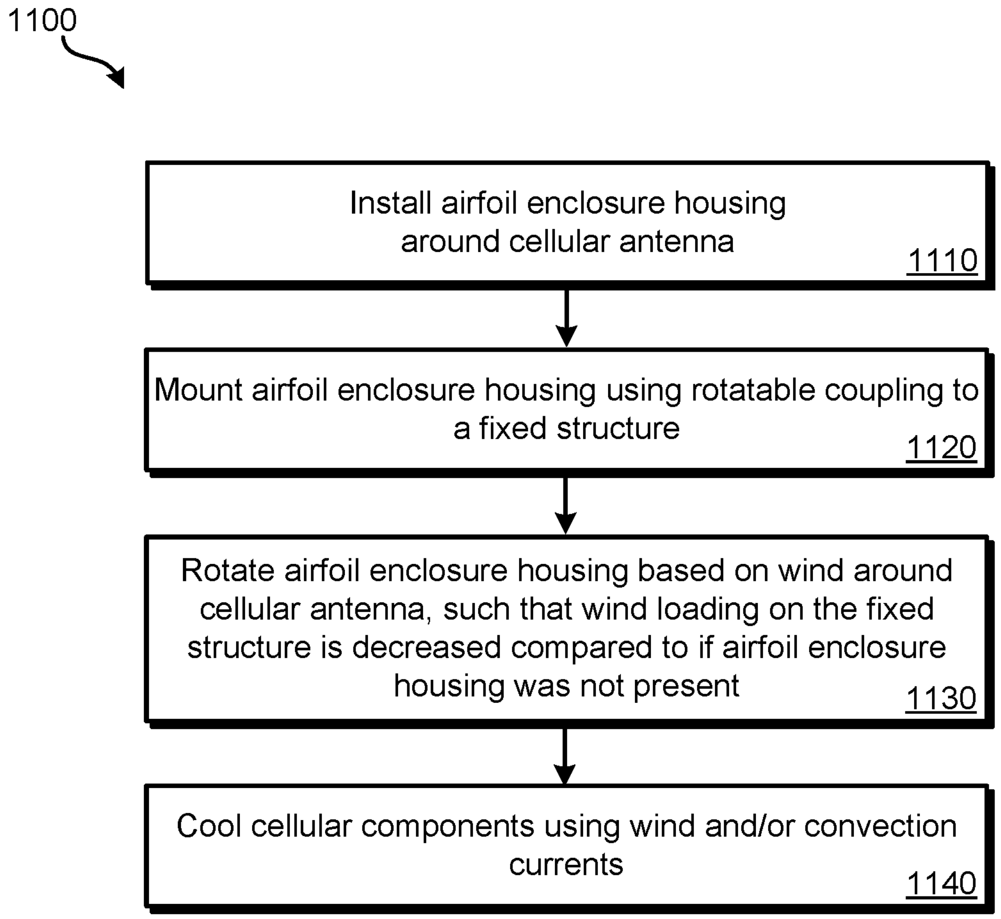
FIG. 11 illustrates an embodiment of a method for housing cellular components to decrease wind loading.

Various methods may be performed with the systems and devices of FIGS. 1-10. FIG. 11 illustrates an embodiment of a method 1100 for housing cellular components to decrease wind loading. At block 1110, an airfoil enclosure housing, such as any of those detailed in relation to FIGS. 1-10, may be installed around one or more cellular antennas. In some embodiments, additional components may be housed by the airfoil enclosure housing, such as one or more radios or radio units, such as radio units of a 5G New Radio (NR) cellular network.

At block 1120, the airfoil enclosure housing may be mounted to a fixed structure, such as cellular tower, telephone pole, light pole, dedicated pole (e.g., for a 5G small cell), bridge, or building. The airfoil enclosure housing may be mounted using a rotatable coupling that allows for rotation clockwise and counterclockwise around the cellular antenna and fixed structure. By being able to rotate, the airfoil enclosure housing orients itself in a direction of least resistance. In other embodiments, the airfoil enclosure housing may be mounted in a fixed orientation such that it does not rotate.

At block 1130, in response to wind, the airfoil enclosure housing can rotate and/or decrease an amount of force from wind resistance on the fixed structure. The amount of wind resistance can be less, possibly significantly less, than if the airfoil enclosure housing was not present and the wind directly contacted the cellular antennas and any other housed components.

At any point after the airfoil enclosure has been installed, block 1140 may be performed. At block 1140, the cellular components housed by the airfoil enclosure may be cooled using wind and/or convection currents. The wind may enter an internal region of the airfoil enclosure via one or more vents oriented to receive wind. Additionally or alternatively, multiple vents may be present on the airfoil enclosure housing to promote heated air to escape the airfoil enclosure housing and draw cooler air into the interior of the airfoil enclosure housing. A vent may function to provide cooling using wind, convection, or both.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A base station cellular antenna enclosure, comprising:
- an airfoil enclosure housing that defines a cavity for housing a base station cellular antenna, wherein the airfoil enclosure housing is spherical, defines a plurality of dimples, and defines a halo vent circular in shape; and
- a plurality of attachments configured to attach the airfoil enclosure to a central structure.

2. The base station cellular antenna enclosure of claim 1, wherein the halo vent is located a distance above a bottom of the airfoil enclosure and is located on a bottom half of the airfoil enclosure.

3. The base station cellular antenna enclosure of claim 1, wherein the halo vent is located a distance below a top of the airfoil enclosure and is located on a top half of the airfoil enclosure.

4. The base station cellular antenna enclosure of claim 1, wherein the airfoil enclosure housing further defines a top vent located at a top of the airfoil enclosure housing.

5. The base station cellular antenna enclosure of claim 4, wherein the airfoil enclosure housing further defines a bottom vent located at a bottom of the airfoil enclosure housing.

6. The base station cellular antenna enclosure of claim 5, wherein the top vent and the bottom vent are circular.

7. The base station cellular antenna enclosure of claim 6, wherein the cavity defined by the airfoil enclosure housing houses one or more antennas that are connected with a radio unit (RU).

8. The base station cellular antenna enclosure of claim 1, wherein the airfoil enclosure housing is at least 75% covered on the exterior by the dimples.

9. The base station cellular antenna enclosure of claim 1, wherein the plurality of attachments attach the base station cellular antenna enclosure to the central structure in a fixed orientation.

10. The base station cellular antenna enclosure of claim 1, wherein the airfoil enclosure housing has a circular cross section.

11. The base station cellular antenna enclosure of claim 1, wherein the central structure is selected from the group consisting of: a cellular tower, a telephone pole, a light pole, and a dedicated pole.

12. A base station system, comprising:
- a radio unit (RU);
- a plurality of cellular antennas; and
- a base station cellular enclosure, comprising:
  - an airfoil enclosure housing that defines a cavity for housing the plurality of cellular antennas, wherein the airfoil enclosure housing is spherical, defines a plurality of dimples, and defines a halo vent circular in shape; and a plurality of attachments configured to attach the airfoil enclosure to a central structure.

13. The base station system of claim 12, further comprising the central structure, wherein the central structure is selected from the group consisting of: a cellular tower, a telephone pole, a light pole, and a dedicated pole.

14. The base station system of claim 13, wherein the plurality of attachments attach the base station cellular enclosure to the central structure in a fixed orientation.

15. The base station system of claim 12, wherein the halo vent is located a distance above a bottom of the airfoil enclosure and is located on a bottom half of the airfoil enclosure.

16. The base station system of claim 12, wherein the airfoil enclosure housing further defines a top vent located at a top of the airfoil enclosure housing.

17. The base station system of claim 16, wherein the airfoil enclosure housing further defines a bottom vent located at a bottom of the airfoil enclosure housing.

* * * * *